United States Patent [19]
Einstein

[11] 4,004,112
[45] Jan. 18, 1977

[54] QUICKLY ATTACHABLE NOTE PAD SUPPORT ACCESSORY FOR DESK TELEPHONES

[75] Inventor: Irving Einstein, Miami Beach, Fla.

[73] Assignees: Ruth Astor, Boulder, Colo.; Estelle Goldberg, Silver Springs, Md.

[22] Filed: Feb. 11, 1976

[21] Appl. No.: 657,213

[52] U.S. Cl. .............................. 179/178; 40/336; 248/302

[51] Int. Cl.² ........................................ H04M 1/21

[58] Field of Search ......... 179/178, 146 R; 40/336, 40/339; 312/317 R, 317 A; 248/302

[56] References Cited
UNITED STATES PATENTS

| | | | |
|---|---|---|---|
| 2,620,407 | 12/1952 | Nagy | 179/178 |
| 2,626,479 | 1/1953 | Marrits | 40/336 X |

*Primary Examiner*—Thomas W. Brown
*Attorney, Agent, or Firm*—Erwin M. Barnett

[57] ABSTRACT

An accessory having a platform for supporting a note pad in horizontal writing position adapted to mount along the rear of a desk telephone has a pair of openings in the platform positioned to be engaged by the projecting tops of the rear pair of cradle posts and a third opening therebetween for holding a writing instrument in upright position. A wire brace is hinged to fold against the bottom side of the platform for packing and shipping and has a stop means whereby the brace assumes as acute angle with respect to the platform when the latter is in a horizontal position to facilitate mounting on the telephone. A modified platform has upstanding tabs for supporting a calender and a removable wire guide for mounting a small directory in closed position or in open position for viewing contents thereof while dialing.

8 Claims, 8 Drawing Figures

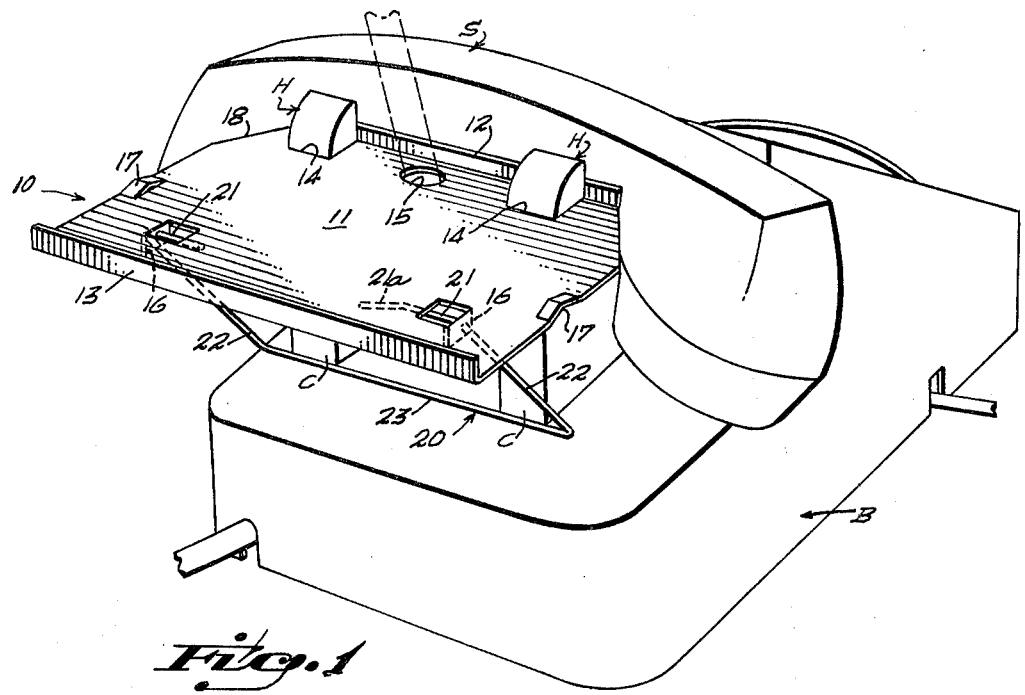
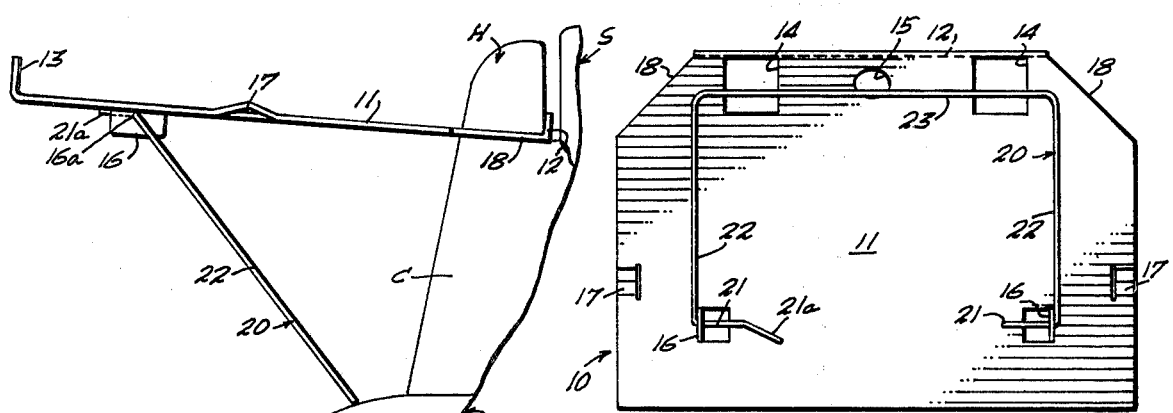
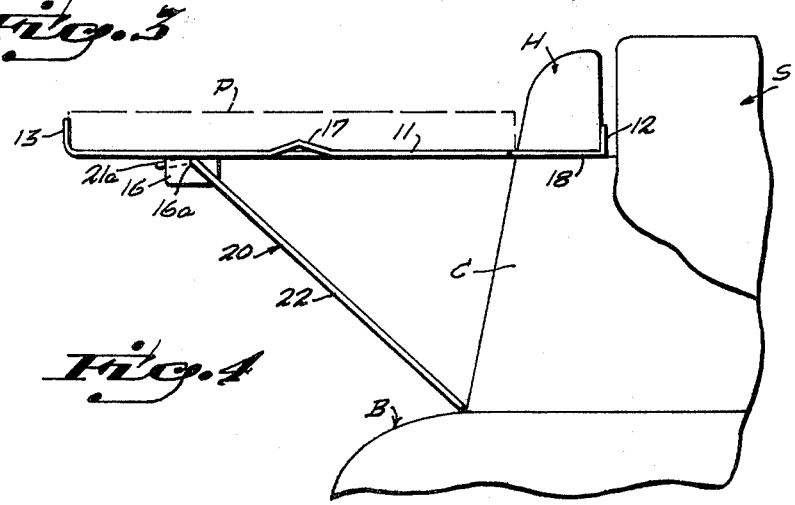

QUICKLY ATTACHABLE NOTE PAD SUPPORT ACCESSORY FOR DESK TELEPHONES

BACKGROUND OF THE INVENTION

1. Field of the Invention

This invention relates generally to collapsible and readily mailable accessories for desk telephones which are easily attachable to serve as a memorandum pad support and writing instrument holder and which also include a support for a calender and a holder for a personal directory in either open or closed position.

2. Description of the Prior Art

There are several disclosures for attachment accessories for the desk telephone presently in wide use and to which the present invention is directed. Such prior art attachments have been found to be cumbersome, to dispose the note pad in an awkward position for writing, to be too costly to produce and hence unsuitable as a give away premium, and to require more that average mechanical skill in transforming the device from its packaged state to its mounted operative position on the telephone base.

SUMMARY OF THE INVENTION

Among the objects of the invention is to provide, for mounting on a desk telephone, a note pad and writing support and pen or pencil holder accessory which shall comprise few and simple parts that are easily assembled into a collapsible unit for compact shipping and adapted for readily mounting on the telephone base without tools and with a minimum of manual skill, and which shall be inexpensive to manufacture yet rugged to withstand intended usage.

This accessory comprises a flat platform which is sized to extend lengthwise along the rear of a desk telephone base having the front edge portion resting on the hand set cradle and being removably attached to the rear horns of the cradle posts by means of a pair of cutout openings through which the horns extend and snugly engage. The platform is mounted to extend widthwise rearwardly in a horizontal plane to support a note pad thereon for access and writing upon and has a third opening formed between the other pair of openings which cooperates with the telephone base to provide a holder for a writing instrument to be lodged therein in an upright position adjacent the note pad. A wire bail-like brace is pivotally attached at opposite ends thereof to a pair of spaced ears extending from the bottom side of the platform adjacent the rear edge thereof and extends downwardly and forwardly to engage a re-entrant corner formed between the skirt and the cradle posts of the telephone base.

One of the features of the invention is the ease of mounting the accessory on the telephone base. To this end, the wire brace folds against the bottom of the platform for packaging and shipping and is provided with a stop means for limiting the downward swing of the brace to a predetermined acute angle with respect to the platform when the mounting procedure, hereinafter described, is performed.

A more versatile form of the invention is contemplated in which the platform includes upturned and staggered tabs integrally formed along the rear edge thereof providing a track in which a calender is mounted in upstanding position. A pair of seats may also be integrally formed in the tab configuration for removably attaching opposite ends of an upstanding wire loop which provides a compartment behind the calender for a personal address and phone number directory which may be stored therein sidewise in closed position or held upright in open position to a desired page for reference while dialing.

BRIEF DESCRIPTION OF THE DRAWINGS

FIG. 1 is a rear perspective view of a desk telephone on which is mounted the note pad support accessory embodying the invention, a writing instrument being indicated in broken lines in position in the holder provided thereby.

FIG. 2 is a bottom plan view of the platform of the accessory shown in FIG. 1 removed from the telephone and showing the brace folded against the bottom side of the platform in shipping position.

FIG. 3 is a fragmentary side elevational view of the desk telephone shown in FIG. 1 in which the platform is illustrated in an intermediate position during mounting, the brace being shown in the predetermined limited position so as to rest on the telephone base as the front side of the platform is brought into position on the cradle preparatory to the brace being pivoted into the corner engaging position shown in FIG. 4.

FIG. 4 is a fragmentary side elevational view of the desk telephone and accessory shown in FIG. 1, the note pad being shown in broken lines.

DESCRIPTION OF THE PREFERRED EMBODIMENTS

Figure 5:
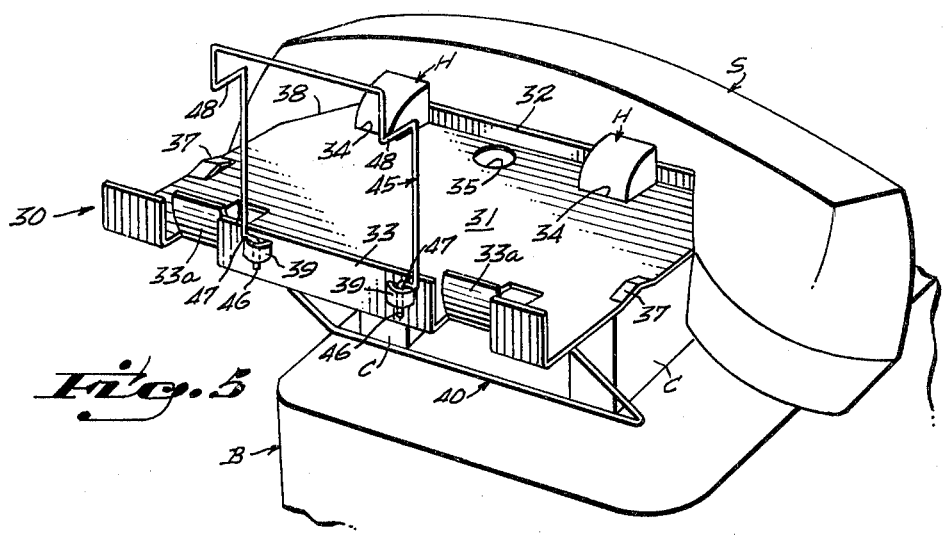
FIG. 5 is a rear perspective view of a desk telephone on which is mounted a modified form of accessory having means for holding a calender and a personal pocket size telephone directory.
Figure 6:
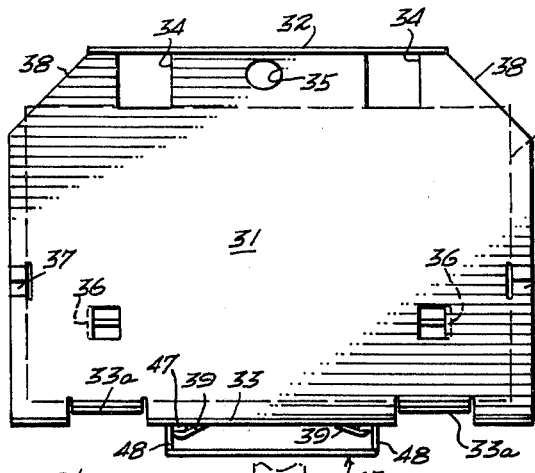
FIG. 6 is a top plan view of the accessory shown in FIG. 5 removed from the telephone base.
Figure 7:
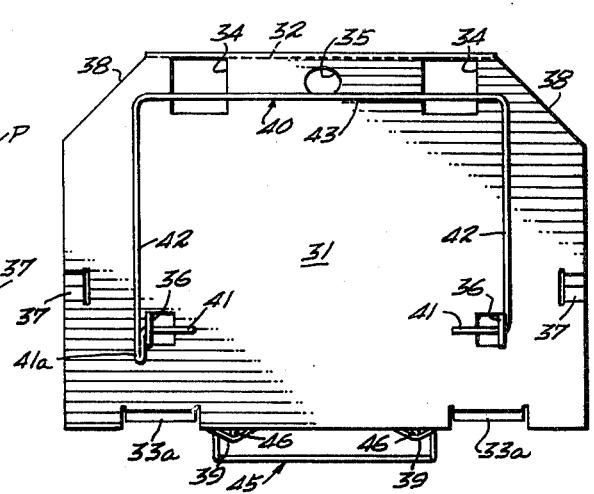
FIG. 7 is a bottom plan view of accessory shown in FIG. 6 with the brace folded against the bottom side of the platform.

Referring in detail to the drawings, 10 generally denotes a note pad support and pen holder accessory constructed to embody the invention shown in FIGS. 1 to 4, inclusive, as a two piece structure comprising a substantially flat platform 11 and pivoted brace 20. Platform 11 may be made of sheet metal, stamped or otherwise formed in a generally rectangular shape, sized to extend along the rear side of a desk telephone base B, and is seen to have upturned front and rear edge flanges 12 and 13 and a pair of cutout openings 14 symmetrically located adjacent front flange 12, spaced and sized to receive therein the pair of rear horns H of telephone base cradle posts C. An oval opening 15, sized to accommodate a pen or pencil, is formed midway between openings 14 and a pair of ears 16 are integrally stamped to project from the bottom side of platform 11 and have openings 16a which are aligned with each other serving as a hinge for brace 20. A pair of raised bosses 17 may be stamped adjacent opposite side edges of platform 11 to coact with horns H and rear edge flange 13 in centering note pad P thereon. The front corners of platform 11 are seen to be beveled at 18 to accommodate the ear and mouth piece enlargements of hand set S as is clear from FIG. 1.

Brace 20, made of wire stock in a generally U-shaped bail-like configuration, has opposite free end portions 21 bent at right angles to opposite parallel portions 22 which are connected in right angular relation to opposite ends of intermediate portion 23. Free end portions 21 extend in axial alignment through openings 16a in ears 16 and may provide means for limiting the downward swing of brace 20 to the predetermined angle shown in FIG. 3. Such limiting means is here shown as a bent terminal portion 21a of one of end portions 21 which is displaced out of the axis of alignment to engage the bottom side of platform 11 as brace 20 swings downwardly.

The operation of accessory 10 will now be apparent. Platform 11 and brace 20, fashioned as hereinbefore described, are assembled simply by inserting bent portion 21a into and through one of the openings 16a and then springing parallel portions 22 apart sufficiently to insert the opposite end portion 21 into its opening 16a. Accessory 10 may then be packaged in a compact condition with brace 20 folded against platform 11.

To mount accessory 10 on telephone base B, platform 11 is held tilted slightly forwardly from the horizontal so that brace 20 drops to the position predetermined by bent portion 21a and, as illustrated in FIG. 3, openings 14 are brought down over horns H until the front edge of platform 11 rests on the cradle and intermediate portion 23 of brace 20 contacts base B. Brace 20 is then swung forwardly to engage the re-entrant corner formed between base B and cradle posts C whereby platform 11 is supported in mounted, horizontal position, as shown in FIG. 4. Accessory 10 is now ready to receive pad P centralized on platform 11 and a writing instrument in oval opening 15.

A modified and more versatile form of the invention is shown in FIGS. 5 to 8, inclusive, as accessory 30 formed as a three piece structure comprising a platform 31, a wire brace 40 and a wire clip 45. Platform 31 is formed with a front edge flange 32, a pair of cut out openings 34 for engaging horns H, an oval, pen holder, opening 35, a pair of integral ears 36 having aligned pivot openings 36a, bosses 37, and beveled front corners 38, all substantially identical to corresponding parts of platform 11. The rear edge upstanding flange of platform 31, designated generally as flange 33, may be higher than flange 13 and is sectionalized to provide a holder for the backing of small calender K. For this purpose portions 33a are cut out of flange 33 and bent up inwardly thereof to provide a pair of spaced tabs which coact with the other portions of flange 33 to form a track between staggered upstanding elements into which a bottom edge border of the backing of calender K is fitted to retain the latter in an upright position as indicated in broken lines in FIG. 8.

Figure 8:
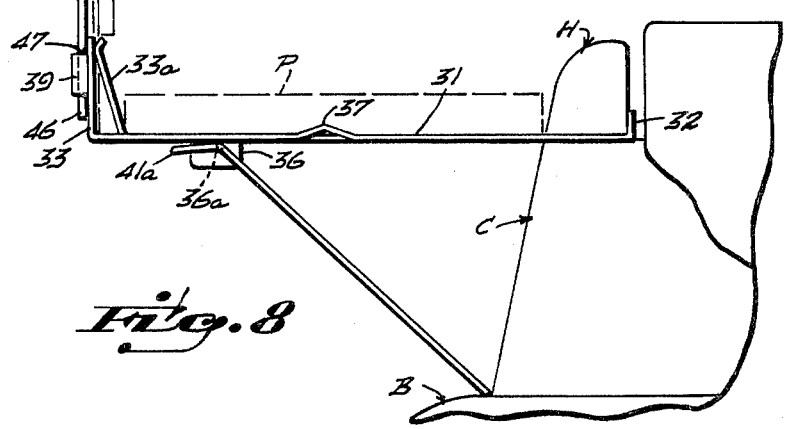
FIG. 8 is a fragmentary side elevational view of the desk telephone and accessory shown in FIG. 5, the note pad, calender and directory being indicated in broken lines.

Brace 40 is similar to brace 20 in being formed with free end portions 41 extending in axial alignment to project through openings 36a in ears 36, a pair of opposite parallel portions 42 and intermediate portion 43. A modified form of limiting means is shown as loop 41a which interconnects one of the free ends 41 to its parallel portion 42 and is bent out of the axis of the latter as shown in FIG. 8 to engage the bottom of platform 31 when brace 40 swings downwardly to a predetermined acute angular position to facilitate mounting accessory 30.

Wire clip 45 may be removably attached to upstand from platform 31 behind calender K to coact therewith in providing compartment means for supporting a personal directory D. To this end, Spaced integral seats 39 are formed on the rear side of the central section of flange 33. Opposite ends 46 of clips 45 insert into seats 39. The upstanding side sections of clip 45 have lateral offsets 47 which serve as stops limiting the extent to which end 46 may slide through seats 39. The side sections of clip 45 also have rearwardly extending offsets 48 upon which directory D may rest when in a closed position or when spread to an open page position.

Accessory 30 may be compactly packaged with brace 40 folded against the bottom side of platform 31 in the same manner as accessory 10 but with clip 45 removed from seats 39. To mount accessory 30 on telephone base B, clip 45 is first attached to platform 31 by inserting ends 46 into seats 39 and then mounting proceeds in the same manner as hereinbefore described for accessory 10. Either before or after mounting accessory 30, calender K may be secured in position between the staggered elements of flange 33 as is clear from FIG. 8.

It will be apparent that braces 20 and 40 are interchangeable on either platform 11 or 31. Also, where the design of telephone base B and hand set S in such that upturned edge flanges 12 and 32 of platforms 11 and 31 interfere with the proper seating of hand set S in its cradle, flanges 12 and 32 may be formed to lie in the plane of the respective platforms 11 and 31 instead of being turned up at right angles thereto.

The note pad support accessories for desk telephones are seen to achieve the several objects of the invention and to be well adapted to meet conditions of practical use. As various possible embodiments might be made in this invention, and as various changes might be made in the disclosed constructions, it is to be understood that all matter herein set forth and shown in the accompanying drawings are to be interpreted as illustrative and not in a limiting sense.

What is claimed is:

1. A desk telephone accessory comprising a flat platform sized to extend along the rear of a desk telephone base and have a front edge portion resting on the hand set cradle and to extend horizontally rearwardly to support a note pad thereon, said front edge portion being formed with a pair of spaced cutout openings for engaging the horns of the rear pair of cradle posts of said base, a pair of spaced ears extending from a bottom side and adjacent a rear edge of said platform, a wire bail-like brace pivotally attached at opposite ends thereof to said ears and extending forwardly and downwardly to engage said telephone base, said brace and horn engagement in the cutout openings supporting said platform in said horizontal position for writing on said note pad positioned on the platform.

2. The accessory defined in claim 1 in which a means limits the pivoting of said brace to a predetermined acute angle with respect to said platform when the latter is suspended in a horizontal position to facilitate mounting the accessory in position on said base.

3. The accessory defined in claim 2 in which said limiting means comprises a portion of one of said ends of said brace being bent at an angle with respect to the axis of said pivot to contact the platform bottom when the brace swings downwardly to said predetermined acute angle.

4. The accessory defined in claim 3 in which said end portion bend is in the form of a loop adjacent said pivot.

5. The accessory defined in claim 1 in which said platform has an upturned rear edge flange sectionalized into staggered elements some of which are upturned inwardly with respect to others forming a track therebetween for supporting a backing of a small calender in upstanding position.

6. The accessory defined in claim 5 in which a pair of spaced seats are integrally formed in the rear facing surface of said flange, and a wire clip having opposite ends removably positioned in said seats supporting the clip in upstanding position behind said calender backing and coacting with the latter to provide a compartment means therebetween for carrying a personal directory therein.

7. The accessory defined in claim 6 in which said wire clip has upstanding side sections formed with rearwardly extending offsets for supporting the directory spread to an open page position and located substantially above the calender for viewing phone number information while dialing.

8. The accessory defined in claim 1 in which an oval opening is formed in said platform being said pair of spaced cutout openings for supporting a writing instrument in an upstanding position therein.

* * * * *